(12) United States Patent
Litwing et al.

(10) Patent No.: US 9,403,419 B2
(45) Date of Patent: Aug. 2, 2016

(54) MOTOR VEHICLE AIR CONDITIONING SYSTEM

(75) Inventors: Erich Litwing, Spraitbach (DE); Sascha Lindauer, Schorndorf (DE); Walter Wolf, Oppenweiler-Zell (DE)

(73) Assignee: MAHLE INTERNATIONAL GMBH, Stuttgart (DE)

( * ) Notice: Subject to any disclaimer, the term of this patent is extended or adjusted under 35 U.S.C. 154(b) by 492 days.

(21) Appl. No.: 13/991,181

(22) PCT Filed: Dec. 1, 2011

(86) PCT No.: PCT/EP2011/071574
§ 371 (c)(1),
(2), (4) Date: Aug. 14, 2013

(87) PCT Pub. No.: WO2012/072775
PCT Pub. Date: Jun. 7, 2012

(65) Prior Publication Data
US 2013/0320102 A1 Dec. 5, 2013

(30) Foreign Application Priority Data

Dec. 2, 2010 (DE) .......................... 10 2010 062 326

(51) Int. Cl.
*B60H 1/04* (2006.01)
*B60H 1/22* (2006.01)
(Continued)

(52) U.S. Cl.
CPC *B60H 1/22* (2013.01); *B21D 53/02* (2013.01); *B60H 1/00521* (2013.01); *B60H 2001/2287* (2013.01); *Y10T 29/49359* (2015.01)

(58) Field of Classification Search
CPC ........... B60H 1/00521; B60H 1/00535; B60H 1/2215; B60H 1/04; B60H 1/22; B60H 2001/2287

USPC ............... 237/12.3 A, 12.3 B, 12.3 C, 28, 81; 123/142.5 R; 165/43; 454/160, 161
IPC ........................................ B60H 1/04,1/22, 1/02
See application file for complete search history.

(56) References Cited

U.S. PATENT DOCUMENTS 5,632,328 A * 5/1997 Sawyer .............. B60H 1/00321
165/67
5,836,380 A * 11/1998 Takesita ............... B60H 1/0005
165/42

(Continued)

FOREIGN PATENT DOCUMENTS

CN 1762730 A 4/2006
CN 101332753 A 12/2008

(Continued)

OTHER PUBLICATIONS

Chinese Office Action and English translation thereof, Appl. No. 201180057645.3, Dec. 18, 2014, 15 pgs.

(Continued)

*Primary Examiner* — Gregory Huson
*Assistant Examiner* — Daniel E Namay
(74) *Attorney, Agent, or Firm* — Paul D. Strain, Esq.; Strain & Strain PLLC

(57) ABSTRACT

In a motor vehicle air conditioning system, comprising a housing, a fan and at least one heating device, the intention is for different heating devices to be able to be fastened to a housing in a technically simple manner with low production costs. This problem is solved in that the at least one heating device is fastened to the housing, in particular exclusively, by at least one adaptor cover.

7 Claims, 6 Drawing Sheets

Figure 1:
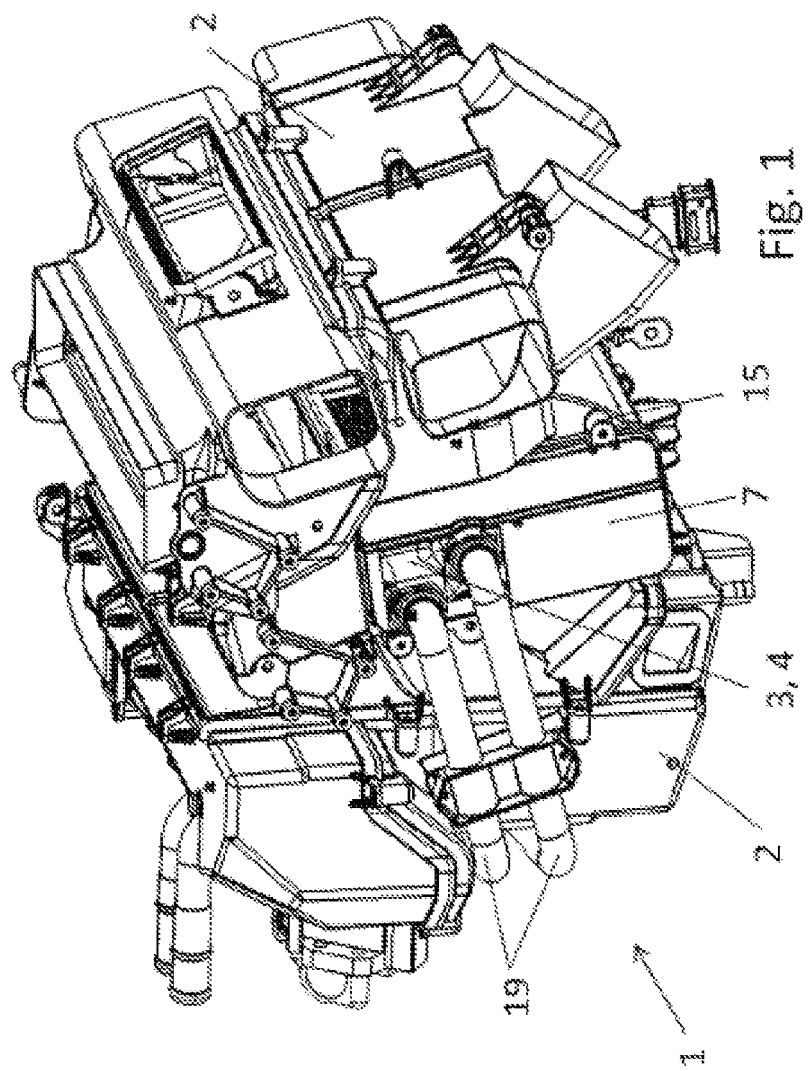

(51) Int. Cl.
  *B60H 1/00* (2006.01)
  *B21D 53/02* (2006.01)
  *B60H 1/02* (2006.01)

(56) References Cited

U.S. PATENT DOCUMENTS

| | | | | |
|---|---|---|---|---|
| 5,853,323 A * | 12/1998 | Beck | B60H 1/00521 | 137/454.2 |
| 5,927,382 A * | 7/1999 | Kokubo | B60H 1/00028 | 165/42 |
| 5,950,711 A * | 9/1999 | Bendell | B60H 1/0005 | 165/126 |
| 6,129,140 A * | 10/2000 | Kawahara | B60H 1/00521 | 165/42 |
| 6,135,201 A * | 10/2000 | Nonoyama | B60H 1/00064 | 165/202 |
| 6,138,749 A * | 10/2000 | Kawai | B60H 1/00064 | 165/204 |
| 6,189,801 B1 * | 2/2001 | Klingler | B60H 1/00521 | 165/78 |
| 6,285,004 B1 * | 9/2001 | Arold | B60H 1/0005 | 165/41 |
| 6,926,206 B2 * | 8/2005 | Schlecht | B60H 1/2212 | 165/41 |
| 6,971,440 B1 * | 12/2005 | Beck | B60H 1/00064 | 165/103 |
| 8,443,873 B2 * | 5/2013 | Nanaumi | B60H 1/0005 | 165/202 |
| 2002/0170707 A1 * | 11/2002 | Shibata | B60H 1/00521 | 165/202 |
| 2003/0079858 A1 * | 5/2003 | Frana-Guthrie | F01P 3/18 | 165/43 |
| 2003/0173413 A1 * | 9/2003 | Schlecht | B60H 1/2212 | 237/12.3 C |
| 2004/0069446 A1 * | 4/2004 | Horiuchi | F28D 1/0443 | 165/43 |
| 2005/0067139 A1 * | 3/2005 | Marginean | B60H 1/00521 | 165/42 |
| 2005/0279484 A1 * | 12/2005 | Vincent | B60H 1/00521 | 165/78 |
| 2006/0000580 A1 | 1/2006 | Vincent et al. | | |
| 2007/0246187 A1 * | 10/2007 | Durfee | B60H 1/00514 | 165/42 |
| 2007/0281599 A1 * | 12/2007 | Mori | B60H 1/00671 | 454/121 |
| 2008/0223550 A1 * | 9/2008 | Kersting | B60H 1/00521 | 165/67 |
| 2011/0005708 A1 * | 1/2011 | Seto | B60H 1/00064 | 165/41 |
| 2011/0005716 A1 * | 1/2011 | Katsuki | B60H 1/00064 | 165/61 |
| 2011/0005730 A1 * | 1/2011 | Habasita | B60H 1/00028 | 165/121 |
| 2012/0132396 A1 * | 5/2012 | Komatsubara | B60H 1/00521 | 165/67 |
| 2012/0280051 A1 * | 11/2012 | Chikagawa | B60H 1/00528 | 237/12.3 R |
| 2013/0320102 A1 * | 12/2013 | Litwing | B60H 1/00521 | 237/28 |

FOREIGN PATENT DOCUMENTS

| | | |
|---|---|---|
| DE | 10 2005 005 880 A1 | 8/2005 |
| DE | 10 2005 029 774 A1 | 3/2006 |
| DE | 10 2004 051 874 B3 | 5/2006 |
| DE | 10 2007 014 976 A1 | 10/2007 |
| DE | 10 2007 019 407 A1 | 11/2007 |
| EP | 2 127 922 A1 | 12/2009 |
| FR | 2 872 090 A1 | 12/2005 |
| JP | 03213418 A * | 9/1991 |
| JP | 05042818 A * | 2/1993 |

OTHER PUBLICATIONS

International Search Report, PCT/EP2011/071574, Aug. 2, 2012, 5 pgs.
German Search Report, DE 10 2010 062 326.1, Jun. 30, 2011, 8 pgs.

* cited by examiner

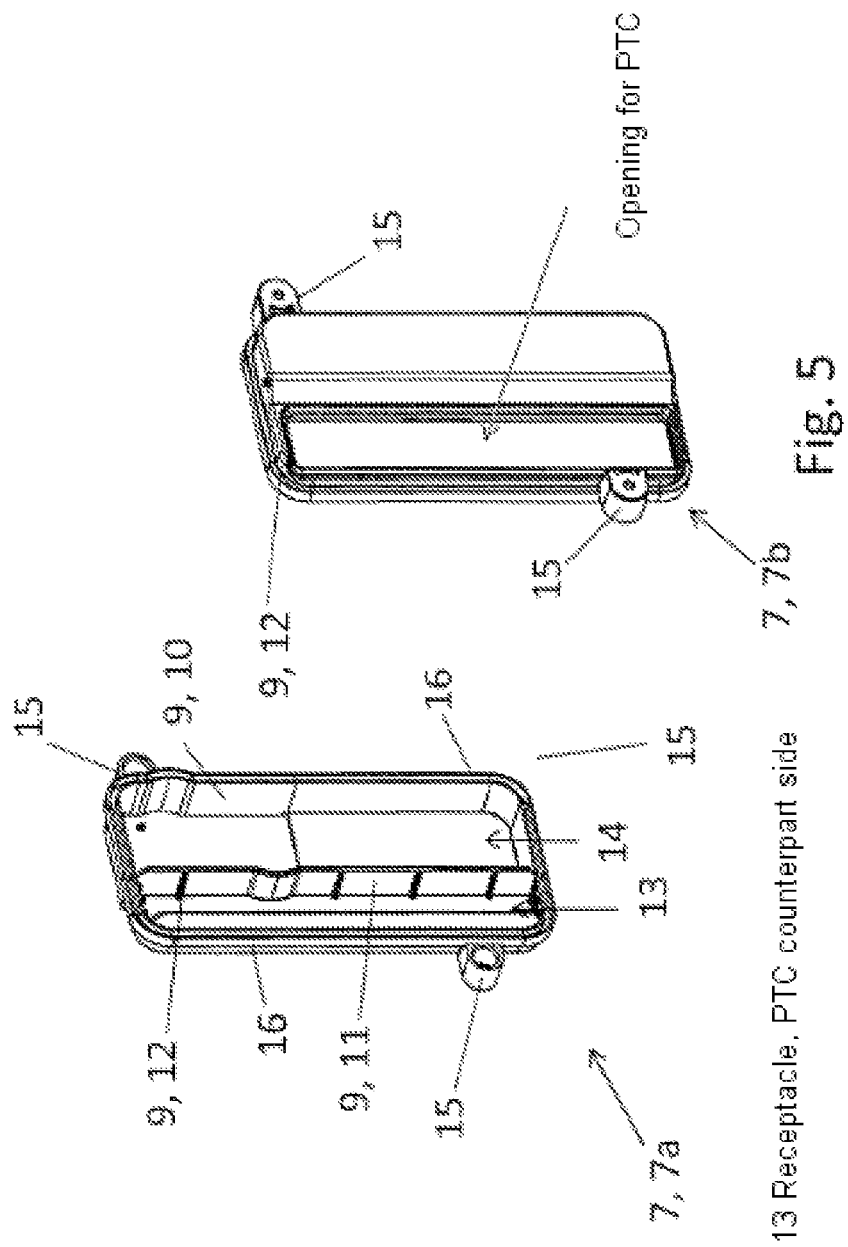

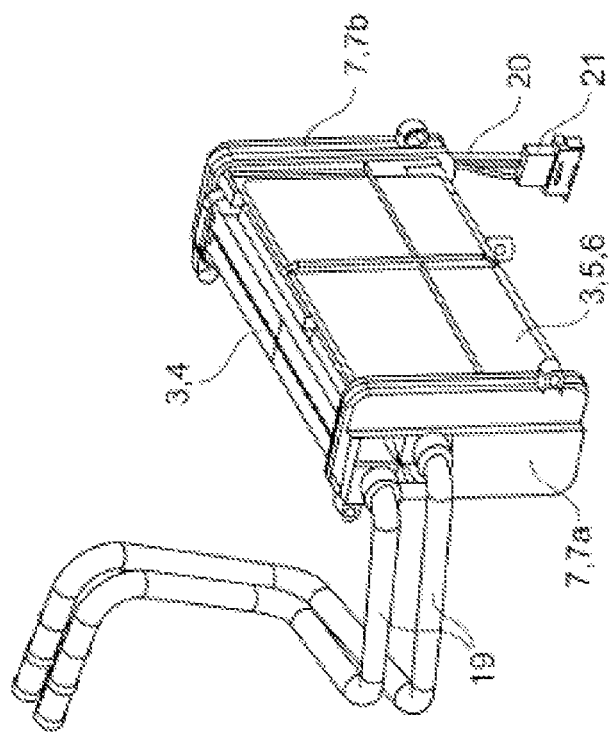

MOTOR VEHICLE AIR CONDITIONING SYSTEM

CROSS-REFERENCE TO RELATED PATENT APPLICATIONS

This application is a National Stage of International Application No. PCT/EP2011/071574, filed Dec. 1, 2011, which is based upon and claims the benefit of priority from prior German Patent Application No. 10 2010 062 326.1, filed Dec. 2, 2010, the entire contents of all of which are incorporated herein by reference in their entirety.

The invention relates to a motor vehicle air conditioning system as per the preamble of claim 1 and to a method for producing motor vehicle air conditioning systems as per the preamble of claim 5.

Motor vehicle air conditioning systems are used in motor vehicles in order to make it possible to cool and/or heat the air to be supplied to an interior compartment of a motor vehicle. For this purpose, the motor vehicle air conditioning system has a refrigerant evaporator for cooling the air and has at least one heating device for heating the air. Here, the at least one heating device may for example be in the form of a heat exchanger which is traversed by a flow of cooling liquid of an internal combustion engine and/or may be in the form of an electric resistance heating device. Here, it is necessary to produce motor vehicle air conditioning systems with different heating devices. The demands arise for example from the type of drive of the motor vehicle, for example a drive with only an internal combustion engine, as a hybrid vehicle with a drive composed of an internal combustion engine and electric motor, or as an electric vehicle with drive provided purely by electric motor. Different demands also arise for different markets and climate zones where the motor vehicle is distributed. Furthermore, the equipment level of the motor vehicle has an influence on the motor vehicle air conditioning system.

In order to be able to produce such different motor vehicle air conditioning systems with different heating devices, it is necessary to also produce different housings of the motor vehicle air conditioning system, to which housings the heating devices are fastened. This is however associated with high cost outlay because, to produce different housings, it is necessary to provide different injection-molding dies for producing a single-part or multi-part housing by means of injection molding, and furthermore, a high level of logistical outlay and conversion outlay is required in the case of a large number of different housings. This entails high costs for the production of the motor vehicle air conditioning system, not least because, owing to the multiplicity of different housings, only a small number of housings can be produced for a certain type of motor vehicle air conditioning system.

It is therefore the object of the present invention to provide a motor vehicle air conditioning system and a method for producing motor vehicle air conditioning systems in which different heating devices can be fastened to a housing in a technically simple manner and with low production costs.

Said object is achieved by means of a motor vehicle air conditioning system comprising a housing, a fan, at least one heating device, wherein the at least one heating device is fastened, in particular exclusively, by means of at least one adapter cover to the housing. The at least one adapter cover is not considered to be a constituent part of the housing of the motor vehicle air conditioning system, such that in this way, it is possible with an identical housing and with different adapter covers for different heating devices to be fastened to the motor vehicle air conditioning system, that is to say to the housing of the motor vehicle air conditioning system.

In particular, the at least one adapter cover closes off, preferably in a fluid-tight manner, in each case one insertion opening on the housing for the at least one heating device. At the insertion opening of the motor vehicle air conditioning system or of the housing of the motor vehicle air conditioning system, an insertion chamber is delimited by the housing of the motor vehicle air conditioning system, and the at least one heating device is arranged in the insertion chamber. The at least one heating device can thus be inserted through the insertion opening into the insertion chamber of the motor vehicle air conditioning system or of the housing of the motor vehicle air conditioning system, and the insertion opening on the insertion chamber can be closed off, preferably in a fluid-tight manner, by means of the at least one adapter cover. In this way, it is possible, after the insertion of the at least one heating device into the insertion opening, for the at least one heating device to be closed off in a fluid-tight manner within the housing of the motor vehicle air conditioning system in that, after the insertion of the at least one heating device into the insertion chamber, the at least one insertion opening is closed off in a fluid-tight manner by means of the at least one adapter cover.

In a further refinement, the housing has two insertion openings which are closed off by in each case one adapter cover. Here, the at least one, preferably two, insertion openings are formed for example on the sides, or on the top and bottom, of the housing of the motor vehicle air conditioning system.

In a supplementary refinement, the at least one adapter cover has at least one fastening geometry for the positively locking and/or non-positively locking fastening of the at least one heating device to the adapter cover, in particular the at least one fastening geometry is of complementary design to the at least one heating device, and/or the at least one heating device is a heat exchanger which can be traversed by flow of cooling liquid and/or is an electric resistance heating device, for example PTC heating device, and/or a separation means for zone separation of the at least one heating direction is arranged on the at least one adapter cover, in particular integrally on the at least one adapter cover. The adapter cover has different fastening geometries for the fastening of different heating devices to the adapter cover. Here, fastening geometries of the adapter cover are also considered to encompass inserts which are fastened to the adapter cover and which serve for the fastening of different heating devices to the adapter cover by way of an indirect fastening to the rest of the adapter cover by means of the insert. With the separation means, it is for example possible to realize two-zone separation of the at least one heating device into a left-hand part and a right-hand part, or in the case of a four-zone motor vehicle air conditioning system, it is possible to attain zone separation into a front left, a front right, a rear left, and a rear right region or zone.

Method according to the invention for producing motor vehicle air conditioning systems with different heating devices, having the steps: providing a housing, fastening different heating devices of different size and/or shape to the housing, wherein the different heating devices are fastened to an identical housing.

In one variant, during the production of a motor vehicle air conditioning system, at least one heating device is inserted into an insertion opening on the housing, and the at least one heating device is subsequently fastened to the housing.

It is expedient if, during the production of a motor vehicle air conditioning system, the at least one heating device is fastened to the housing by virtue of the at least one heating device being fastened, in particular in a positively locking and/or non-positively locking manner, to a fastening geometry of at least one adapter cover and the adapter cover being fastened to the housing, and/or, during the production of a motor vehicle air conditioning system, at least one insertion opening is closed off, preferably in a fluid-tight manner, by means of an adapter cover.

In a further embodiment, during the production of a motor vehicle air conditioning system, the at least one heating device is fastened by means of two adapter covers to the housing, and two insertion openings of the housing are closed off, preferably in a fluid-tight manner, by means of the two adapter covers.

In particular, adapter covers with different fastening geometries and identical fastening interfaces are provided, and/or different heating devices are fastened by means of different adapter covers to the housing and the different adapter covers have different fastening geometries.

In a further refinement, the different adapter covers are fastened with a fastening interface to an identical counterpart fastening interface on the identical housing, and the fastening interfaces of the different adapter covers are identical. Here, the fastening interface and counterpart fastening interface are respectively formed for example as a tongue-and-groove connection or as an interface with a planar abutment ring, for example with a seal arranged between the two abutment rings.

In an additional refinement, the motor vehicle air conditioning system comprises an actuator, for example an electric motor or an electromagnet, and a mechanism or gearing, and the actuator is mechanically connected (by means of the mechanism or the gearing) to at least one air-guiding device such that the at least one air-guiding device can be moved by the actuator by means of the mechanism or the gearing.

In a further variant, the motor vehicle air conditioning system comprises a refrigerant evaporator and/or an air filter.

The housing of the motor vehicle air conditioning system is expediently of single-part or multi-part form.

In a further refinement, the motor vehicle air conditioning system has at least one air-guiding device, for example at least one air flap or one roller shutter, for controlling the flow rate of the air that can be conducted through an air duct.

The motor vehicle air conditioning system preferably has at least one air duct, in particular a fresh-air duct and/or the recirculated-air duct and/or the supply duct, for conducting air.

In particular, the housing of the motor vehicle air conditioning system is composed at least partially of plastic.

The at least one air duct is expediently delimited by a wall of the housing.

In a further refinement, the actuator has a position determining device for detecting the position of the mechanism, for example of a shaft.

In particular, the position determining unit is connected to a control unit for the motor vehicle air conditioning system, and by means of the data detected by the position determining unit, the actuator can be controlled in order to attain a certain position of the mechanism or of the at least one air-guiding device.

Figure 2:
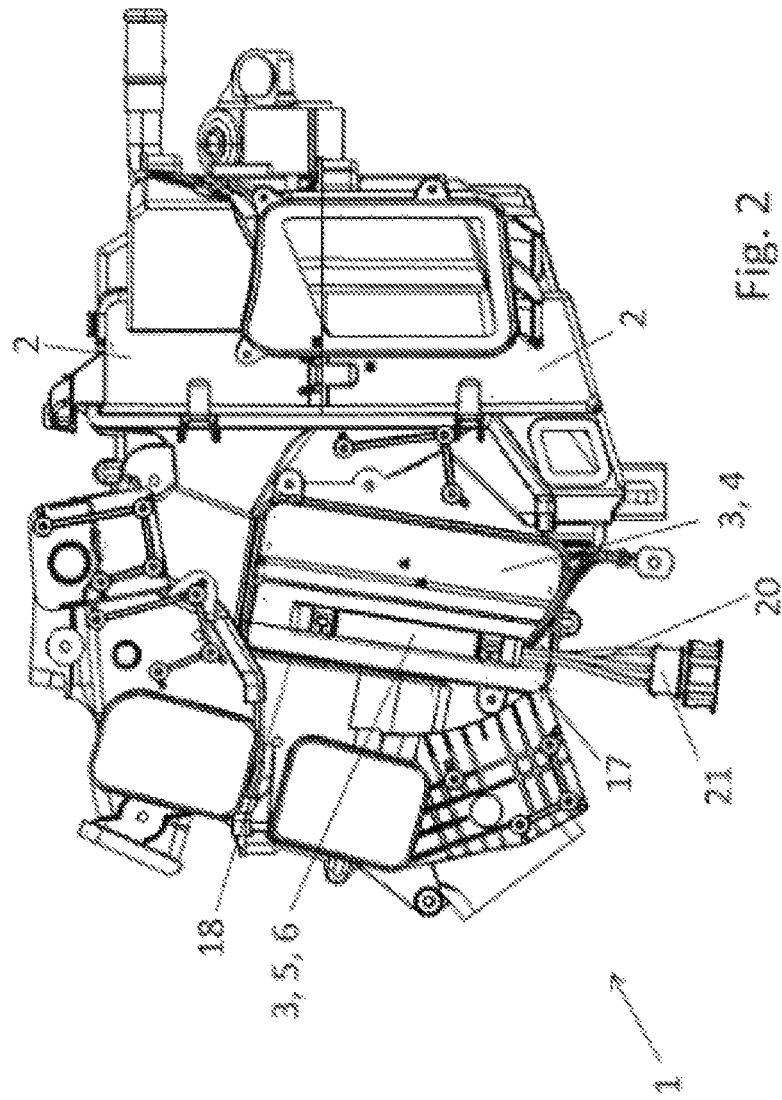
Figure 3:
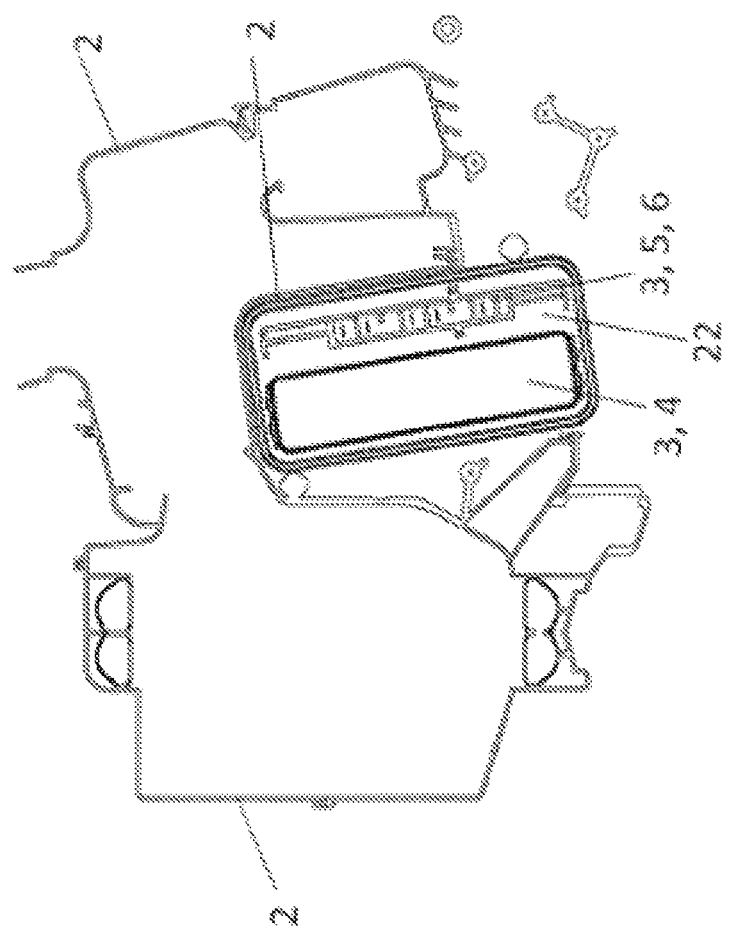
Figure 4:
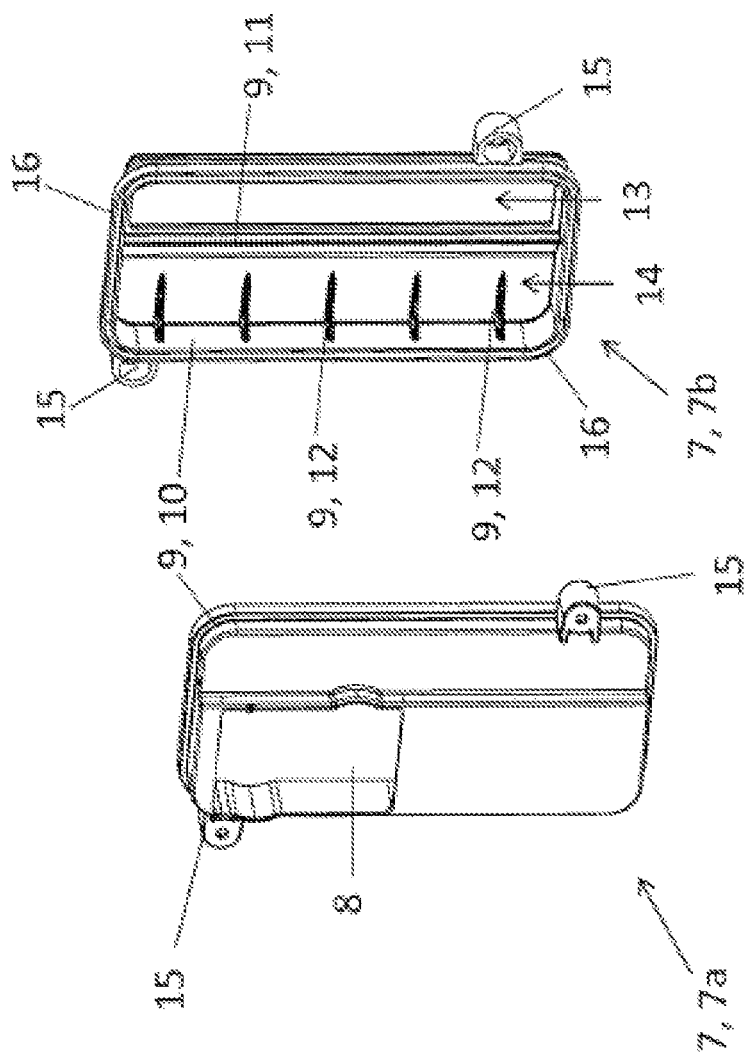

An exemplary embodiment of the invention will be described in more detail below with reference to the appended drawings, in which:

FIG. 1 shows a perspective view of a motor vehicle air conditioning system,

FIG. 2 shows a side view of the motor vehicle air conditioning system as per FIG. 1, FIG. 3 shows a vertical section through the motor vehicle air conditioning system as per FIG. 1, FIG. 4 shows a perspective view of the adapter cover in a first exemplary embodiment of the motor vehicle air conditioning system as per FIG. 1, FIG. 5 shows a perspective view of the adapter cover in a second exemplary embodiment in a view from another side, and FIG. 6 shows a perspective view of two heating devices which are fastened to the adapter covers as per FIG. 4, or two heating devices with the associated adapter covers, which advantageously form an exchangeable thermal module.

A motor vehicle air conditioning system 1 serves to supply cooled and/or heated air to an interior compartment of a motor vehicle. Arranged within a single-part or multi-part housing 2 composed of thermoplastic material there are a fan, an air filter, a refrigerant evaporator (not illustrated) and at least one heating device 3. Here, the air is inducted by the fan either from a fresh-air inlet opening and/or from a recirculated-air inlet opening. At the fresh-air inlet opening, the air is inducted from the surroundings of the motor vehicle, and at the recirculated-air inlet opening, the air is inducted from the interior compartment of the motor vehicle. By means of a recirculated-air flap as an air-guiding device, it is possible to control and/or regulate the amount of air inducted through the fresh-air inlet opening and/or through the recirculated-air inlet opening from the housing. Here, the housing 2 or walls of the housing 2 delimit at least one air duct for conducting air. Within said air duct, an air filter is arranged downstream of the fan as viewed in the flow direction of the air, or alternatively, within said air duct, the air filter is arranged upstream of the fan and the refrigerant evaporator is provided. After the air is conducted through that refrigerant evaporator and optionally cooled at the refrigerant evaporator if a refrigeration circuit having a compressor and a condenser is in operation, the air can be heated at at least one heating device 3. Here, two heating devices 3 are in the form of a heat exchanger 4, which can be traversed by flow of cooling liquid of an internal combustion engine, and in the form of an electric resistance heating device 5, that is to say PTC heating device 6. After the air delivered by the fan flows through the heat exchanger 4 and the electric resistance heating device 5, the air flows out of the motor vehicle air conditioning system 1 through at least one air outlet opening on the housing 2. As air outlet openings, there are provided for example a defrosting air outlet opening for supplying air to a windshield, a footwell air outlet opening for supplying air into the footwell of the interior compartment of the motor vehicle, and/or a dashboard air outlet opening for supplying air into the interior compartment of the motor vehicle in the region of the dashboard.

The housing 2 of the motor vehicle air conditioning system 1 delimits an insertion chamber 22 for the heat exchanger 4 and the electric resistance heating device 5. Here, FIG. 3 shows a vertical section through the motor vehicle air conditioning system 1 in a longitudinal direction of the motor vehicle. Here, for simplicity, only the housing and the two heating devices 3 of the motor vehicle air conditioning system 1 are illustrated in FIG. 3. The insertion chamber 22 thus runs in a transverse direction of the motor vehicle air conditioning system 1 and ends with a left-hand insertion opening 17 on the left-hand side of the motor vehicle air conditioning system 1 (the left-hand insertion opening 17 is closed off in FIG. 1 by a left-hand adapter cover 7a as an adapter cover 7), and the right-hand insertion opening 17 is illustrated in the side view of the motor vehicle air conditioning system 1 in FIG. 2. Here, the right-hand insertion opening 17 may be closed off by a right-hand adapter cover 7b (FIG. 4).

The two adapter covers 7 composed of thermoplastic material have a wall, and a fully encircling web 10 as a fastening geometry 9 is formed on the edge or on the end of said wall. Furthermore, in each case one web 11 is also provided on the wall of the two adapter covers 7. Here, on the two adapter covers 7 in the first exemplary embodiment according to FIG. 4, the encircling web 10 and the web 11 delimit a first receiving shell 13 and a second receiving shell 14. On the second receiving shell 14, ribs 12 are also formed both on the wall and also on the encircling web 10. Furthermore, each adapter cover 7 is provided with two fastening lugs 15. Here, the fastening lugs 15 have bores, and by means of said bores and the fastening lugs 15, the two adapter covers 7 can be screwed by means of two screws (not illustrated) to the housing 2 of the motor vehicle air conditioning system 1. The encircling web 10, the web 11 and the ribs 12 thus form a fastening geometry 9 for the fastening or fixing of the heat exchanger 4 and of the electric resistance heating device 5 to the two adapter covers 7. Here, the relatively small electric resistance heating device 5 is fastened to the smaller, first receiving shell 13, and the relatively large heat exchanger 4 is fastened to the larger, second receiving shell 14. The wall of the left-hand adapter cover 7 is provided with an opening 8. Through said opening 8, lines 19 for cooling liquid may be guided through the adapter cover 7 (FIG. 6). For the supply of electrical current to the electric resistance heating device 5, the latter is provided with power cables 20 and with a plug 21. Here, the power cables 20 are guided through a cutout (not illustrated) on the housing 2 from the insertion chamber 22 into the surroundings of the motor vehicle air conditioning system, or to outside the housing 2, in the region of a counterpart fastening interface 18 on the housing 2. Here, the leadthrough of the power cables 20 through the housing 2 is of fluid-tight configuration.

Here, the power cables are guided out of the cover of the PTC heater, and the PTC head closes off the opening in FIG. 5.

The two adapter covers 7 have a fastening interface 16 on the end of the encircling web 10. Here, the fastening interface 16 on the adapter covers 7 and the counterpart fastening interface 18 on the housing 2, that is to say at the two insertion openings 17 of the housing 2, are in the form of a tongue-and-groove connection. The fastening interface 16 on the adapter cover 7 is a groove, and the counterpart fastening interface 18 on the housing 2 is a tongue which engages into the groove on the adapter cover 7. Here, a fully encircling seal, for example O-ring seal, is arranged in the groove of the adapter cover 7 if necessary. The tongue-and-groove connection may alternatively also already exhibit adequate sealing. During the production of the motor vehicle air conditioning system 1, the two insertion opening 17 on the insertion chamber 22 are firstly open, that is to say are not closed off by the two adapter covers 7. For the fastening of the two heating devices 3 to the housing 2 of the motor vehicle air conditioning system 1, one insertion opening 17 is firstly closed off in a fluid-tight manner by means of an adapter cover 7, and the adapter cover 7 is fastened to the housing 2 by means of two screws. Subsequently, both the heat exchanger 4 and also the electric resistance heating device 5 are inserted into the insertion chamber 22 through the other, still-open insertion opening 17, and here, the heat exchanger 4 is placed in engagement with the second receiving shell 14 of the already-fastened adapter cover 7, and the electric resistance heating device 5 is placed in engagement with the first receiving shell 13 on the already-fastened adapter cover 7. Subsequently, the second adapter cover 7, too, may be fastened to the still-open insertion opening 17 on the housing 2 by means of the two screws, such that the two insertion openings 17 are closed off in a fluid-tight manner by the two adapter covers 7. On the second fastened adapter cover 7, too, the heat exchanger 4 is fastened to the second receiving shell 14 and the electric resistance heating device 5 is fastened to the first receiving shell 13. Here, the geometry of the heat exchanger 4 is of complementary design to the second receiving shell 14, and the geometry of the electric resistance heating device 5 is of complementary design to the first receiving shell 13 of the two adapter covers 7. This results in a positively locking and/or non-positively locking connection between the two adapter covers 7 and the two heating devices 3. FIG. 6 shows such a perspective view of the two heating devices 3 which are fastened to the adapter covers 7, illustrated without the housing 2 or the rest of the motor vehicle air conditioning system 1. Here, the fastening geometries 9 on the left-hand and right-hand adapter covers 7 may also be designed differently.

FIG. 5 illustrates a second exemplary embodiment of the two adapter covers 7. Substantially only the differences in relation to the first exemplary embodiment of the two adapter covers 7 as per FIG. 4 will be described below. The adapter covers in FIG. 5 differ from the adapter covers in FIG. 4 merely in that the fastening geometry 9 has a different shape or geometry. Thus, in the same way as described above, it is possible by means of the two adapter covers 7 as per FIG. 5 for different heating devices 3 to be fastened to an otherwise identical housing 2. Here, the adapter covers 7 illustrated in FIG. 5 have the same fastening interface 16 as the two adapter covers 7 illustrated in FIG. 4. As a result, for the fastening of different heating devices 3 in the insertion chamber 22 of the housing 2, no modifications need be made to the housing 2, and it is possible with an identical housing 2, using merely different adapter covers 7, for different heating devices 3 to be fastened within the insertion chamber 22. The heating devices 3 differ for example in that the electric resistance heating device 5 is designed for a low-voltage range or a high-voltage range, or by different sizes of surface area of the heat exchanger 4. As a fastening interface 16 and counterpart fastening interface 18, it is also possible, instead of the tongue-and-groove connection illustrated in FIGS. 4 and 5, for a planar, fully encircling abutment edge to be provided both on the adapter cover 7 and also on the housing 2 in the region of the two insertion openings 17.

Viewed as a whole, the motor vehicle air conditioning system 1 according to the invention is associated with significant advantages. During the production of the motor vehicle air conditioning system 1, it is possible for different heating devices 3 to be fastened to the identical housing 2 by virtue of said different heating devices being fixed indirectly to the housing 2 using different adapter covers 7 with different fastening geometries 9. In this way, it is possible to save costs during the production of the motor vehicle air conditioning system 1, because an identical housing 2 can be used for different motor vehicle air conditioning systems 1 with different heating devices 3.

Here, it may by all means be advantageous if zone separation can be realized by means of partitions and the sealing thereof can be performed.

Variants of heating devices or zone separation variants may be generated through the use of different adapter covers.

Furthermore, variants of air conditioning systems may be generated by means of thermal modules. Depending on the air conditioning system concept and construction, the thermal module may also comprise air-guiding and/or shut-off elements (for example flaps, louvers, roller shutters, etc).

For servicing work, for example, the cover may be formed on the left or on the right, for example in the case of left-hand drive (LHD) or right-hand drive (RHD) variants, for example, for PTC servicing, on the left for LHD and on the right for RHD, using an identical PTC auxiliary heater.

In this way, it is advantageously possible to use standard components, for example uniform PTC auxiliary heaters, for different variants through adaptation to the air conditioning systems by means of the individual cover design.

An improvement of the zone separation in the case of two-zone and multi-zone systems may also be attained using standard components.

For example, sealing elements may be used which are fastened to one heat exchanger or which are mounted on and between the two heat exchangers.

As an insert, the device may advantageously be used, as a preassembled unit with preassembled zone separation elements, or zone separation elements integrated on the heat exchanger, from one side.

Elements for sealing a zone separation arrangement may optionally be integrated on one or both adapter covers. Said elements may however also be mounted on one or both heat exchangers, for example by penetrating into the ribs.

It is basically expedient if the heat exchangers can be realized as a module or in a module. Here, the heat exchangers 4, also referred to as heating bodies, may be provided in various dimensions. In combination with a resistance or PTC heating device 5, 6. Here, the resistance or PTC heating device 5, 6 may also be provided with different power ratings depending on the dimensioning and engine configuration of the vehicle for which it will be used. Modularization may thus have the effect that different equipment configurations of heat exchangers 4 and resistance or PTC heating devices are provided as different modules. Here, in the case of the provision of different heat exchangers with different power ratings, it may be advantageous for the arrangement in the module to be realized such that said heat exchangers are situated in each case in the same reference plane with their inlet end surface facing the airflow.

The heating module may also be expanded to also include flaps integrated into the module. Drives for the flaps could alternatively or additionally also be integrated. In addition or as an alternative to a flap, a guide wall for conducting a flow may also be provided. Here, the number of flaps and/or guide walls may be oriented to the number of zones in the air conditioning system.

Here, it is also advantageous if there is a similar resulting regulating characteristic in the case of different equipment configurations of heat exchanger and/or PTC heating device in the module.

Furthermore, it may also be expedient if covers that are provided can also serve as holding elements for drives.

LIST OF REFERENCE NUMERALS

1 Motor vehicle air conditioning system
2 Housing
3 Heating device
4 Heat exchanger traversed by a flow of cooling liquid
5 Electric resistance heating device
6 PTC heating device
7 Adapter cover, 7a, 7b
8 Opening in adapter cover
9 Fastening geometry
10 Encircling web
11 Web
12 Ribs
13 First receiving shell
14 Second receiving shell
15 Fastening lug
16 Fastening interface
17 Insertion opening
18 Counterpart fastening interface
19 Line for cooling liquid
20 Power cable for electric resistance heating device
21 Plug on power cable
21 Insertion chamber

The invention claimed is:

1. A motor vehicle air conditioning system, comprising
a housing,
a fan, and
at least one heating device, wherein the at least one heating device is one heating device of a plurality of different heating devices, each having different size or shape,
wherein the at least one heating device is fastened exclusively by two adapter covers to the housing,
wherein the two adapter covers are selected from multiple adapter covers having different fastening geometries and having identical fastening interfaces, wherein the different fastening geometries each correspond to the size or shape of one of the plurality of different heating devices, wherein each heating device of the plurality of heating devices can be fastened to an identical housing by using adapter covers having a fastening geometry corresponding to the heating device.

2. The motor vehicle air conditioning system as claimed in claim 1, wherein the two adapter covers each close off in a fluid-tight manner an insertion opening on the housing for inserting the at least one heating device.

3. The motor vehicle air conditioning system as claimed in claim 1, wherein the housing comprises two insertion openings on the housing for inserting the at least one heating device which are closed off by in each case one adapter cover of the two adapter covers.

4. The motor vehicle air conditioning system as claimed in claim 1,
wherein the two adapter covers each have at least one fastening geometry for the positively locking or non-positively locking fastening of the at least one heating device to the adapter cover,
wherein the at least one fastening geometry of each of the two adapter covers is of complementary design to the at least one heating device,
wherein the at least one heating device is a heat exchanger which can be traversed by flow of cooling liquid or is an electric resistance heating device,
wherein a separation for zone separation of the at least one heating direction is arranged integrally on each of the two adapter covers.

5. A method for producing motor vehicle air conditioning systems comprising different heating devices, said method comprising:
providing a housing,
fastening different heating devices of different size or shape to the housing, wherein the different heating devices are fastened to an identical housing,
further comprising inserting into an insertion opening on the housing at least one heating device and fastening the at least one heating device to the housing,
further comprising fastening the at least one heating device to a fastening geometry of two adapter covers in a positively locking or non-positively locking manner,
further comprising fastening the two adapter covers to the housing, and/or,
further comprising, closing off the insertion opening in a fluid-tight manner by fastening the two adapter covers to the housing, wherein when multiple motor vehicle air conditioning systems having different heating devices are produced,
further comprising providing multiple adapter covers having different fastening geometries and having identical fastening interfaces wherein the different fastening geometries correspond to the different heating devices, wherein each heating device of the heating devices is fastened to an identical housing by using an adapter cover which has a fastening geometry corresponding to the heating device.

6. The method as claimed in claim 5,
further comprising fastening the at least one heating device to the housing by fastening the at least one heating device to the two adapter covers and subsequently fastening the two adapter covers to the housing,
further comprising closing off two insertion openings of the housing in a fluid-tight manner by said fastening of the two adapter covers to the housing.

7. The method as claimed in claim 5,
further comprising fastening the different adapter covers using an identical fastening interface, wherein the identical housing comprises a counterpart fastening interface.

\* \* \* \* \*